United States Patent
Nowaczyk et al.

(10) Patent No.: US 9,441,700 B2
(45) Date of Patent: *Sep. 13, 2016

(54) SHOCK ABSORBER WITH FREQUENCY DEPENDENT PASSIVE VALVE

(71) Applicant: Tenneco Automotive Operating Company Inc., Lake Forest, IL (US)

(72) Inventors: Mark Nowaczyk, Heers (BE); Jan Vochten, St. Truiden (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 93 days.

This patent is subject to a terminal disclaimer.

(21) Appl. No.: 14/459,513

(22) Filed: Aug. 14, 2014

(65) Prior Publication Data

US 2016/0047432 A1 Feb. 18, 2016

(51) Int. Cl.
  *F16F 9/49* (2006.01)
  *F16F 9/512* (2006.01)
  *F16F 9/348* (2006.01)

(52) U.S. Cl.
  CPC .............. *F16F 9/512* (2013.01); *F16F 9/348* (2013.01); *F16F 9/3488* (2013.01)

(58) Field of Classification Search
  CPC ........ F16F 9/3214; F16F 9/34; F16F 9/3405; F16F 9/344; F16F 9/348; F16F 9/3482; F16F 9/3484; F16F 9/3488; F16F 9/512; F16F 9/5126
  See application file for complete search history.

(56) References Cited

U.S. PATENT DOCUMENTS

| 4,723,640 | A | * | 2/1988 | Beck ...................... | B60G 17/08 137/614.2 |
|---|---|---|---|---|---|
| 4,854,429 | A | * | 8/1989 | Casey ..................... | F16F 9/465 137/599.16 |
| 5,078,241 | A | * | 1/1992 | Ackermann ..... | B60G 17/01941 188/266.7 |
| 5,129,488 | A | * | 7/1992 | Furuya ................... | B60G 17/08 188/282.6 |
| 5,139,119 | A | | 8/1992 | Karnopp | |
| 5,248,014 | A | * | 9/1993 | Ashiba ..................... | F16F 9/50 188/282.5 |
| 5,386,892 | A | * | 2/1995 | Ashiba .................... | F16F 9/516 188/280 |
| 5,423,402 | A | | 6/1995 | de Kock | |
| 5,467,852 | A | | 11/1995 | de Kock | |
| 5,927,449 | A | * | 7/1999 | Huang ...................... | F16F 9/34 188/282.2 |

(Continued)

FOREIGN PATENT DOCUMENTS

DE        4327358        10/1994
DE     60210652(T2)        8/2006

(Continued)

OTHER PUBLICATIONS

International Search Report and Written Opinion dateed Sep. 21, 2015 in corresponding PCT Application No. PCT/US2015/038413 (9 pages).

*Primary Examiner* — Nicholas J Lane
(74) *Attorney, Agent, or Firm* — Harness, Dickey & Pierce, P.L.C.

(57) ABSTRACT

A shock absorber has a pressure tube with a piston assembly slidably disposed within the pressure tube and attached to a piston rod. The piston assembly divides the pressure tube into an upper working chamber and a lower working chamber. The piston assembly includes a frequency dependent valve assembly attached to the piston rod which defines a housing attached to the piston rod and a spool valve assembly. The spool valve assembly includes a spool valve and a bypass valve assembly that controls fluid flow through bypass passage that bypasses the piston assembly.

12 Claims, 5 Drawing Sheets

(56) References Cited

U.S. PATENT DOCUMENTS

| | | |
|---|---|---|
| 6,334,516 B1 | 1/2002 | Shirley et al. |
| 6,668,986 B2 | 12/2003 | Moradmand et al. |
| 9,222,539 B1* | 12/2015 | Nowaczyk ............. F16F 9/512 |
| 2004/0200946 A1* | 10/2004 | Pradel .................. F16F 9/5126 |
| | | 248/560 |
| 2005/0045440 A1 | 3/2005 | Kock et al. |
| 2006/0283675 A1 | 12/2006 | Teraoka et al. |
| 2011/0024245 A1* | 2/2011 | Nezu ..................... F16F 9/5126 |
| | | 188/283 |
| 2014/0048366 A1* | 2/2014 | Lee ...................... F16F 9/5126 |
| | | 188/322.15 |
| 2015/0053518 A1* | 2/2015 | Nowaczyk ............ F16F 9/5126 |
| | | 188/313 |
| 2015/0247546 A1* | 9/2015 | Nowaczyk .............. F16F 9/512 |
| | | 188/313 |

FOREIGN PATENT DOCUMENTS

| | | |
|---|---|---|
| EP | 1442227 | 8/2004 |
| JP | 07-174183 | 7/1995 |
| JP | 07-217696 | 8/1995 |
| JP | 2011-007213 | 1/2011 |
| WO | 2011/120119 | 10/2011 |
| WO | 2013/051934 | 4/2013 |
| WO | 2014/104876 | 7/2014 |

* cited by examiner

SHOCK ABSORBER WITH FREQUENCY DEPENDENT PASSIVE VALVE

FIELD OF THE INVENTION

The present disclosure relates to a hydraulic damper or shock absorber adapted for use in a suspension system such as the systems used for automotive vehicles. More particularly, the present disclosure relates to a hydraulic damper having a frequency dependent passive valving system that provides softer damping characteristics with high frequency road inputs in rebound or compression strokes.

BACKGROUND OF THE INVENTION

A conventional prior art hydraulic damper or shock absorber comprises a cylinder defining a fluid chamber having a piston slidably disposed in the fluid chamber with the piston separating the interior of the cylinder into an upper and a lower working chamber. A piston rod is connected to the piston and extends out of one end of the cylinder. A first valving system is incorporated for generating damping force during the extension or rebound stroke of the hydraulic damper and a second valving system is incorporated for generating damping force during the compression stroke of the hydraulic damper.

Various types of damping force generating devices have been developed to generate desired damping forces in relation to the frequency of the inputs from the roads over which the vehicle travels. These frequency dependent selective damping devices provide the ability to have softer damping characteristics with higher frequency road inputs. These softer damping characteristics lead to a more effective isolation of the vehicle body from unwanted disturbances. Typically these frequency dependent damping devices operate only during an extension or a rebound movement of the hydraulic damper or shock absorber and some operate during both an extension and a rebound movement of the hydraulic damper or shock absorber.

The continued development of hydraulic dampers includes the development of frequency dependent damping devices that improve the function in an extension/rebound movement or a compression movement of the hydraulic damper or shock absorber.

SUMMARY OF THE INVENTION

The present disclosure provides the art with a frequency dependent hydraulic damper or shock absorber that provides soft damping in rebound or compression strokes of the hydraulic damper or shock absorber. Soft damping is provided for the higher frequency road inputs in the extension/rebound stroke or the compression stroke of the hydraulic damper or shock absorber.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the disclosure, its application, or uses.

Figure 1:
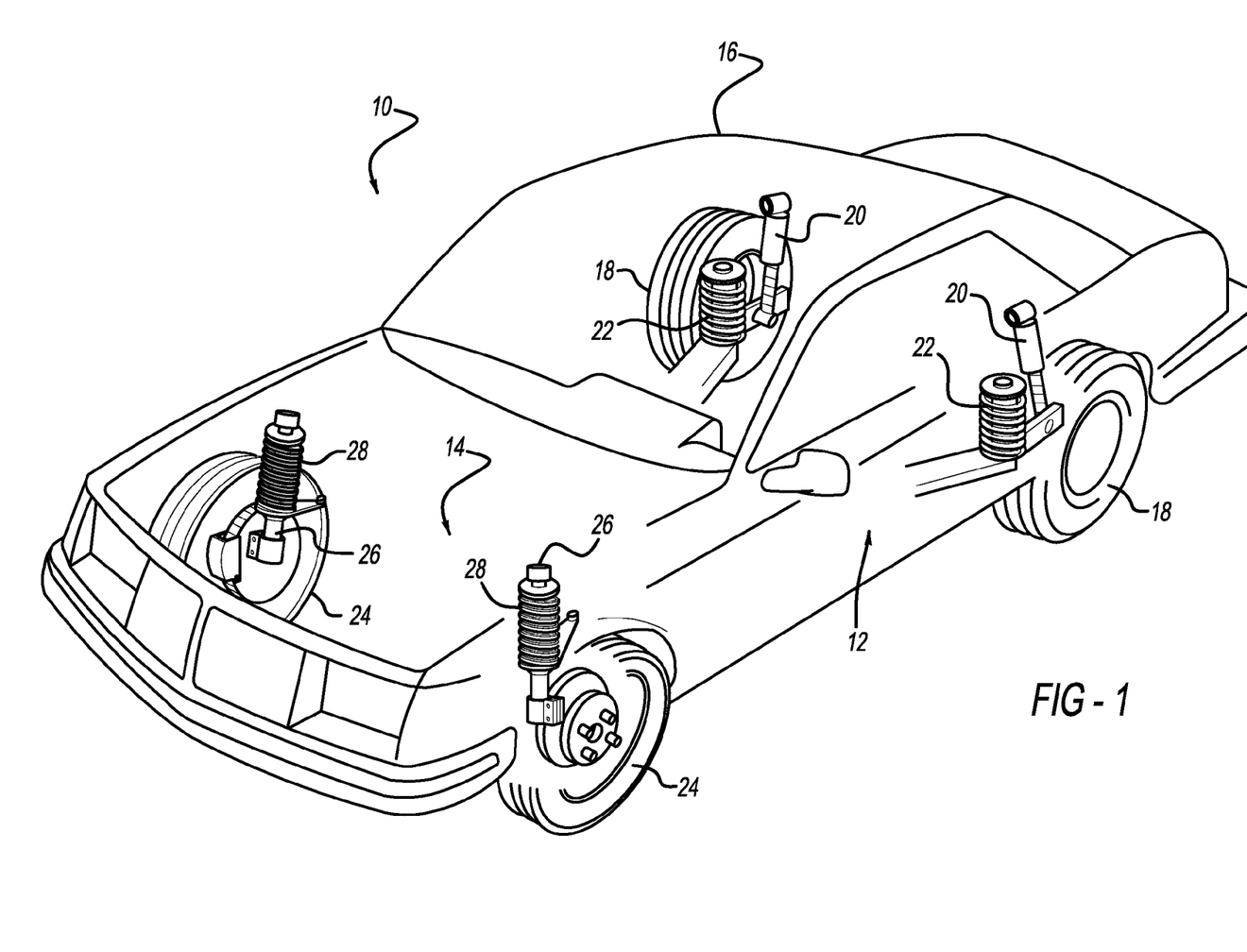
FIG. 1 is an illustration of an automobile using shock absorbers incorporating the frequency dependent damping device in accordance with the present disclosure.

Referring now to the drawings in which like reference numerals designate like or corresponding parts throughout the several views, there is shown in FIG. 1 a vehicle incorporating a suspension system having the frequency dependent shock absorbers in accordance with the present disclosure which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
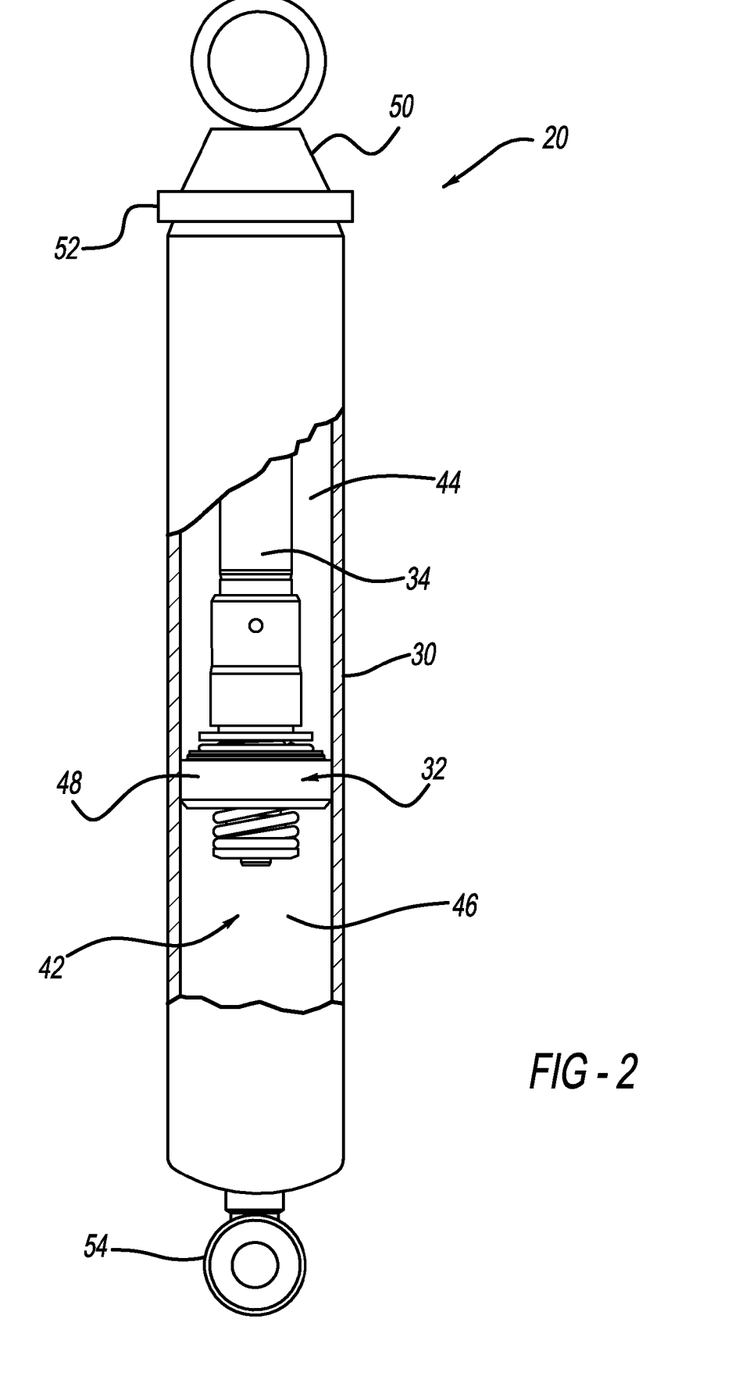
FIG. 2 is a cross-sectional side view of a monotube shock absorber incorporating the frequency dependent damping device in accordance with the present disclosure.

Referring now to FIG. 2, shock absorber 20 is shown in greater detail. While FIG. 2 shows only shock absorber 20, it is to be understood that shock absorber 26 also includes the piston assembly described below for shock absorber 20. Shock absorber 26 only differs from shock absorber 20 in the way in which it is adapted to be connected to the sprung and unsprung portions of vehicle 10. Shock absorber 20 comprises a pressure tube 30, a piston assembly 32 and a piston rod 34.

Pressure tube 30 defines a fluid chamber 42. Piston assembly 32 is slidably disposed within pressure tube 30 and divides fluid chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of pressure tube 30. A sealing system 52 seals the interface between upper end cap 50 and piston rod 34. The end of piston rod 34 opposite to piston assembly 32 is adapted to be secured to the sprung or unsprung portion of vehicle 10. In the preferred embodiment, piston rod 34 is secured to body 16 or the sprung portion of vehicle 10. Pressure tube 30 is filled with fluid and it includes a fitting 54 for attachment to the sprung or unsprung portion of the vehicle. In the preferred embodiment fitting 54 is secured to the unsprung portion of the vehicle. Thus, suspension movements of the vehicle will cause extension or compression movements of piston assembly 32 with respect to pressure tube 30. Valving within piston assembly 32 controls the movement of fluid between upper working chamber 44 and lower working chamber 46 during movement of piston assembly 32 within pressure tube 30.

Figure 3:
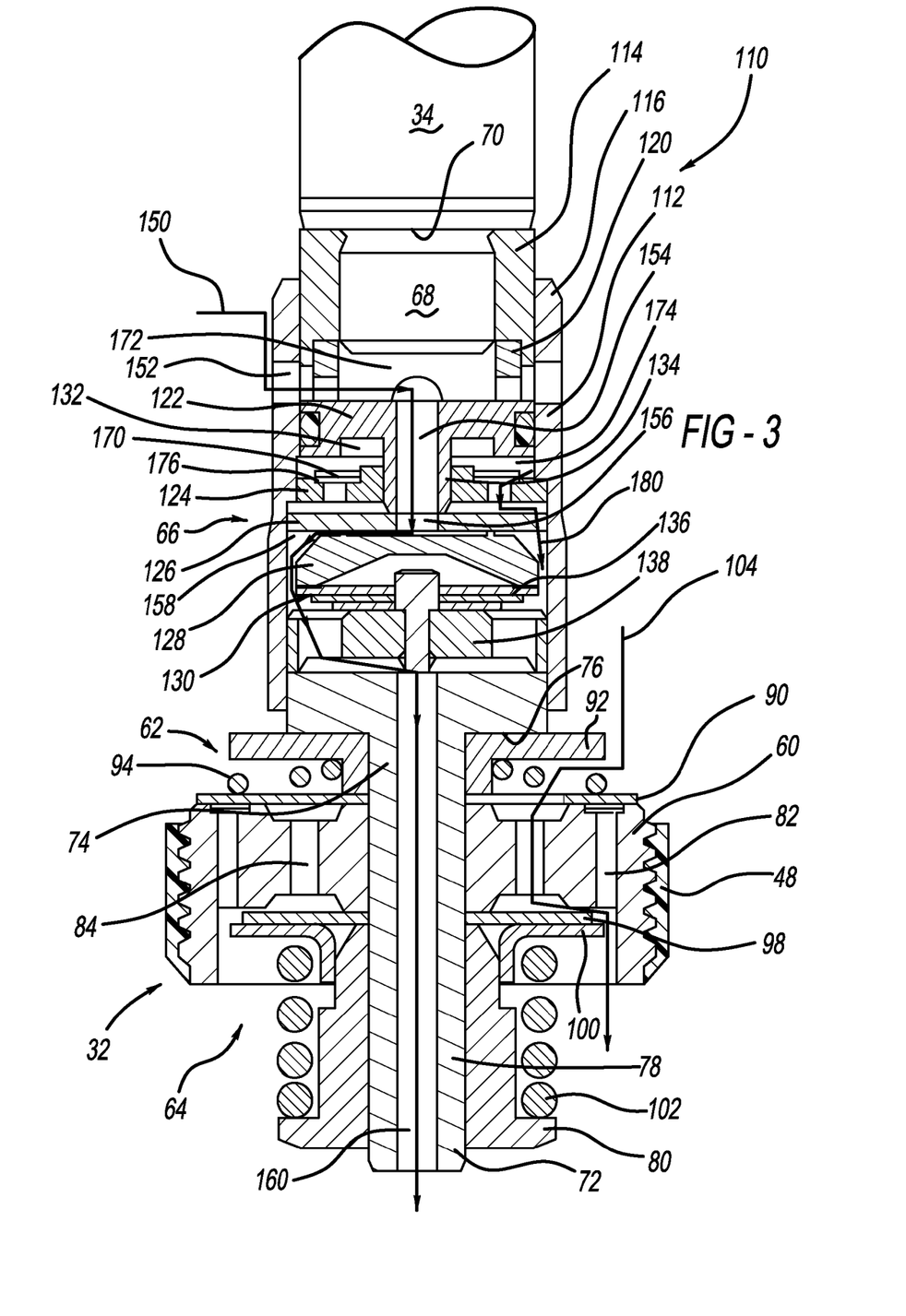
FIG. 3 is an enlarged cross-sectional side view illustrating a piston assembly of the shock absorber shown in FIG. 1 incorporating a frequency dependent damping device which functions during a rebound or extension stroke of the shock absorber.

Referring now to FIG. 3, piston assembly 32 is attached to piston rod 34 and comprises a piston body 60, a compression valve assembly 62, an extension or rebound valve assembly 64 and a frequency dependent valve assembly 66. Piston rod 34 includes a reduced diameter section 68 located on the end of piston rod 34 disposed within pressure tube 30 to form a shoulder 70 for mounting the components of piston assembly 32. Frequency dependent valve assembly 66 is located on reduced diameter section 68. The opposite end of frequency dependent valve assembly 66 is attached to a piston post 72. Piston post 72 includes a reduced diameter section 74 to form a shoulder 76 for mounting piston body 60, compression valve assembly 62 and extension or rebound valve assembly 64. Piston body 60 is located on reduced diameter section 74 with compression valve assembly 62 being located between piston body 60 and shoulder 76 and with rebound valve assembly 64 being located between piston body 60 and a threaded end 78 of piston post 72. A retaining nut 80 is threadingly or slidingly received on threaded end 78 or reduced diameter section 74 of piston post 72 to secure piston body 60, compression valve assembly 62 and extension or rebound valve assembly 64 to piston post 72. Piston body 60 defines a plurality of compression flow passages 82 and a plurality of rebound flow passages 84.

Compression valve assembly 62 comprises a compression valve plate 90, a valve stop 92 and a spring 94. Valve plate 90 is disposed adjacent to piston body 60 to cover the plurality of compression flow passages 82. Valve stop 92 is disposed adjacent shoulder 76 and spring 94 is disposed between valve plate 90 and valve stop 92 to bias valve plate 90 against piston body 60. During a compression stroke of shock absorber 20, fluid pressure builds up in lower working chamber 46 until the fluid pressure applied to valve plate 90 through compression flow passages 82 overcomes the load provided by spring 94. Valve plate 90 will move away from piston body 60 and compress spring 94 to open compression flow passages 82 to allow fluid to flow from lower working chamber 46 to upper working chamber 44 as shown by arrow 96 in FIG. 5.

Rebound valve assembly 64 comprises one or more valve plates 98, a spring seat 100 and a spring 102. Valve plates 98 are disposed adjacent to piston body 60 to cover the plurality of rebound flow passages 84. Spring seat 100 is disposed immediately adjacent valve plates 98. Spring 102 is disposed between spring seat 100 and retaining nut 80 to bias spring seat 100 against valve plates 98 and valve plates 98 against piston body 60. Retaining nut 80 is threaded onto threaded end 78 of piston post 72 to retain valve plates 98 against piston body 60 to close rebound flow passages 84 using spring 102 and spring seat 100. During an extension stroke of shock absorber 20, fluid pressure builds up in upper working chamber 44 until the fluid pressure applied to valve plates 98 through rebound flow passages 84 overcomes the load provided by spring 102. Valve plates 98 will move away from piston body 60 and compress spring 102 to open rebound flow passages 84 to allow fluid to flow from upper working chamber 44 to lower working chamber 46 as shown by arrow 104 in FIG. 3.

Figure 5:
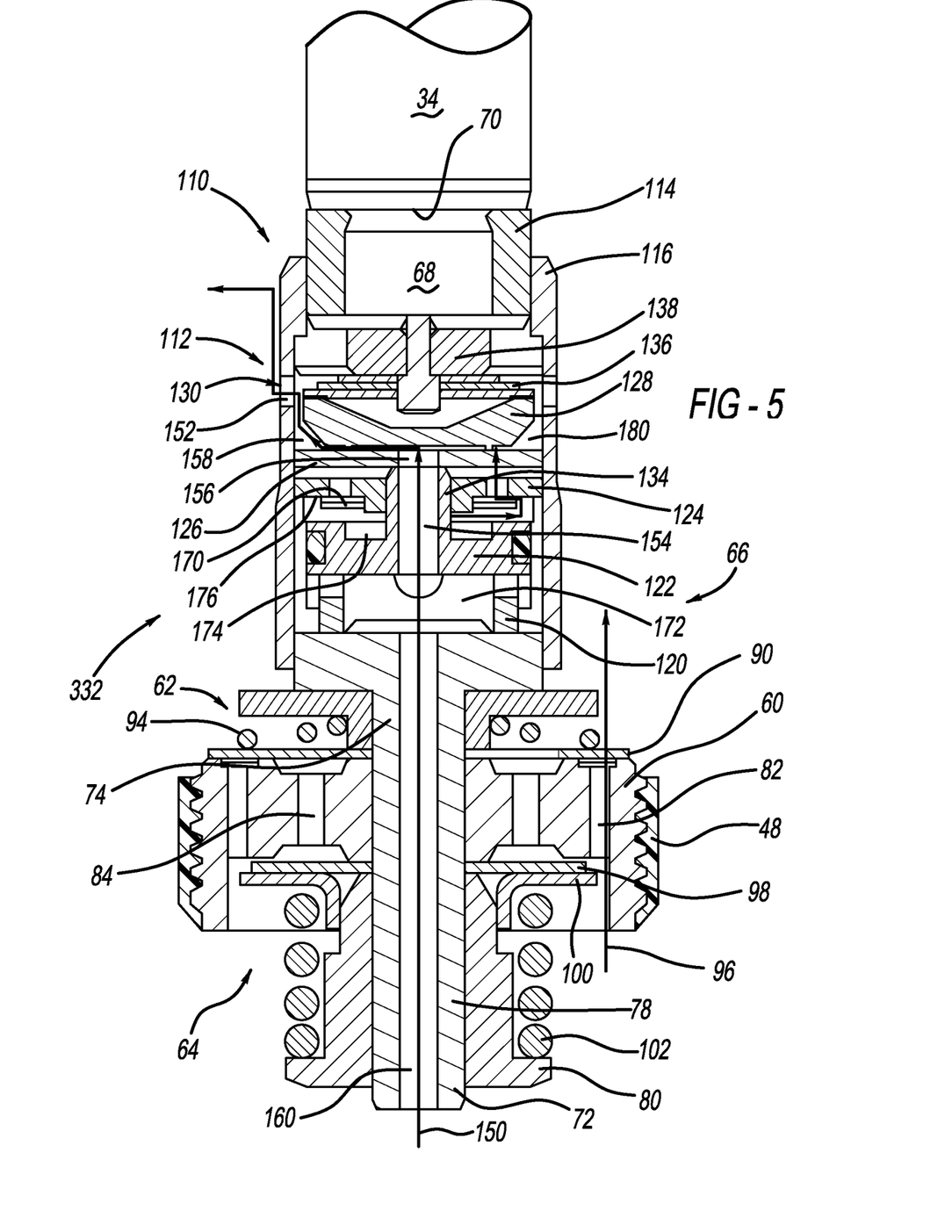
FIG. 5 is an enlarged cross-sectional side view illustrating a piston assembly of the shock absorber shown in FIG. 1 incorporating a frequency dependent device which functions during a compression stroke of the shock absorber.

Referring now to FIG. 3, frequency dependent valve assembly 66 is illustrated. Frequency dependent valve assembly 66 provides frequency dependent damping in rebound (extension) only. FIG. 5 illustrates a frequency dependent valve assembly 266 for shock absorber 20 which provides frequency dependent damping in compression only. Frequency dependent valve assembly 66 includes a housing assembly 110 and a spool valve assembly 112. Housing assembly 110 includes an upper housing 114 and a lower housing 116. Upper housing 114 is threadingly or otherwise attached to the end of piston rod 34. Lower housing 116 is threadingly or otherwise attached to upper housing 114 at one end and threadingly or otherwise attached to piston post 72 at the opposite end.

Spool valve assembly 112 includes an end stop 120, a spool valve 122, a valve body 124, a valve seat plate 126, an interface 128 and a disc pack 130. Spool valve 122 is disposed within a fluid cavity 132 defined by housing assembly 110. Spool valve 122 is slidably disposed within both valve body 124 and housing assembly 110.

Valve body 124 is fixedly secured to housing assembly 110 by welding or by other means known in the art. Valve seat plate 126 is disposed adjacent valve body 124 such that a shaft 134 of spool valve 122 extends through valve body 124 to contact valve seat plate 126. Interface 128 is located on the side of valve seat plate 126 opposite to spool valve 122. Disc pack 130 includes one or more discs 136 directly contacting interface 128 and a disc housing 138 to which the one or more discs 136 are attached using a retainer.

FIG. 3 illustrates fluid flow during a rebound (extension) stroke of shock absorber 20. During a rebound (extension) stroke, fluid pressure in upper working chamber 44 and in rebound flow passages 84 will increase until the biasing load on valve plates 98 increases to the point that spring 102 is compressed and valve plates 98 are lifted entirely off of piston body 60 to fully open rebound flow passages 84 as illustrated by arrow 86. Rebound valve assembly 64 is a passive valve assembly with a firm damping characteristic.

At the beginning of the rebound (extension) stroke, prior to the opening of rebound valve assembly 64, fluid will flow through a bypass flow path illustrated by arrow 150 which bypasses piston body 60, compression valve assembly 62 and rebound valve assembly 64. Flow path 150 extends from upper working chamber 44 through a radial passage 152 in lower housing 116, an axial passage 154 in spool valve 122 and an axial passage 156 in valve seat plate 126 into a bypass chamber 158 defined by housing 110 and interface 128. Flow path 150 proceeds around the one or more discs 136 of disc pack 130, through disc housing 138 into an axial fluid passage 160 through piston post 72 into lower working chamber 46.

In the rest position, spool valve 122 is in contact with end stop 120 and end stop 120 is in contact with housing assembly 110. Shaft 134 of spool valve 122 is in contact with valve seat plate 126 which is in contact with interface 128. Disc pack 130 works as a spring and preloads interface 128 against valve seat plate 126. In this position, a check valve 170 on valve body 124 is closed.

During the rebound (extension) movement, flow 150 will enter frequency dependent valve assembly 66 through radial passage 152 extending through lower housing 116. The fluid flow will pressurize a chamber 172 located within housing assembly 110 between spool valve 122 and piston rod 34 resulting in a working force being exerted on spool valve 122 in the direction of valve seat plate 126. Check valve 170 on valve body 124 stays closed and the fluid in a chamber 174 on the opposite side of spool valve 122 will be forced away through a tunable orifice 176 which is located between check valve 170 and valve body 124. This is illustrated using arrow 180.

During a low frequency rebound (extension) movement there is time enough to press away the fluid in chamber 174 between spool valve 122 and valve body 124 so spool valve 122 is able to move such that the preload between valve seat plate 126 and interface 128 will be increased due to the movement of valve seat plate 126 and interface 128 by shaft 134 of spool valve 122. The preload will be increase such that the load working at the same time between valve seat place 126 and interface 128 due to fluid pressure from axial passages 154 and 156 is not able to separate interface 128 from valve seat plate 126 resulting in a closed valve. Thus, there will be no flow 150 from upper working chamber 44 to lower working chamber 46 because shaft 134 of spool valve 122 will remain seated on valve seat plate 126. Thus, the low frequency damping characteristics will be the same as the original passive damping generated by rebound valve assembly 64.

During a high frequency rebound (extension) movement, there is not enough time to press away the fluid in chamber 174 between spool valve 122 and valve body 124. In this scenario, shaft 134 of spool valve 122 is not able to move valve seat plate 126 and the preload between valve seat plate 126 and interface 128 will not be increased. At the same time, the fluid pressure flowing through axial passages 154 and 156 will work on interface 128 and this fluid pressure will be able to separate interface 128 from valve seat plate 126 resulting in fluid flow 150 from upper working chamber 44 to lower working chamber 46. This fluid flow will cause a dropping off of the rebound damping. Thus, spool valve 122, valve body 124, valve seat plate 126, interface 128 and disc pack 130 operates as a bypass valve assembly to allow fluid flow 150.

During rebound (extension) movement with an intermediate frequency between a load frequency and a high frequency, only a portion of the fluid between spool valve 122 and valve body 124 will be pressed away via orifice 176 resulting in a smaller increase in preload between valve seat plate 126 and interface 128. This smaller preload will still allow fluid flow 150 but in a smaller amount resulting in a smaller rebound damping drop.

Figure 4:
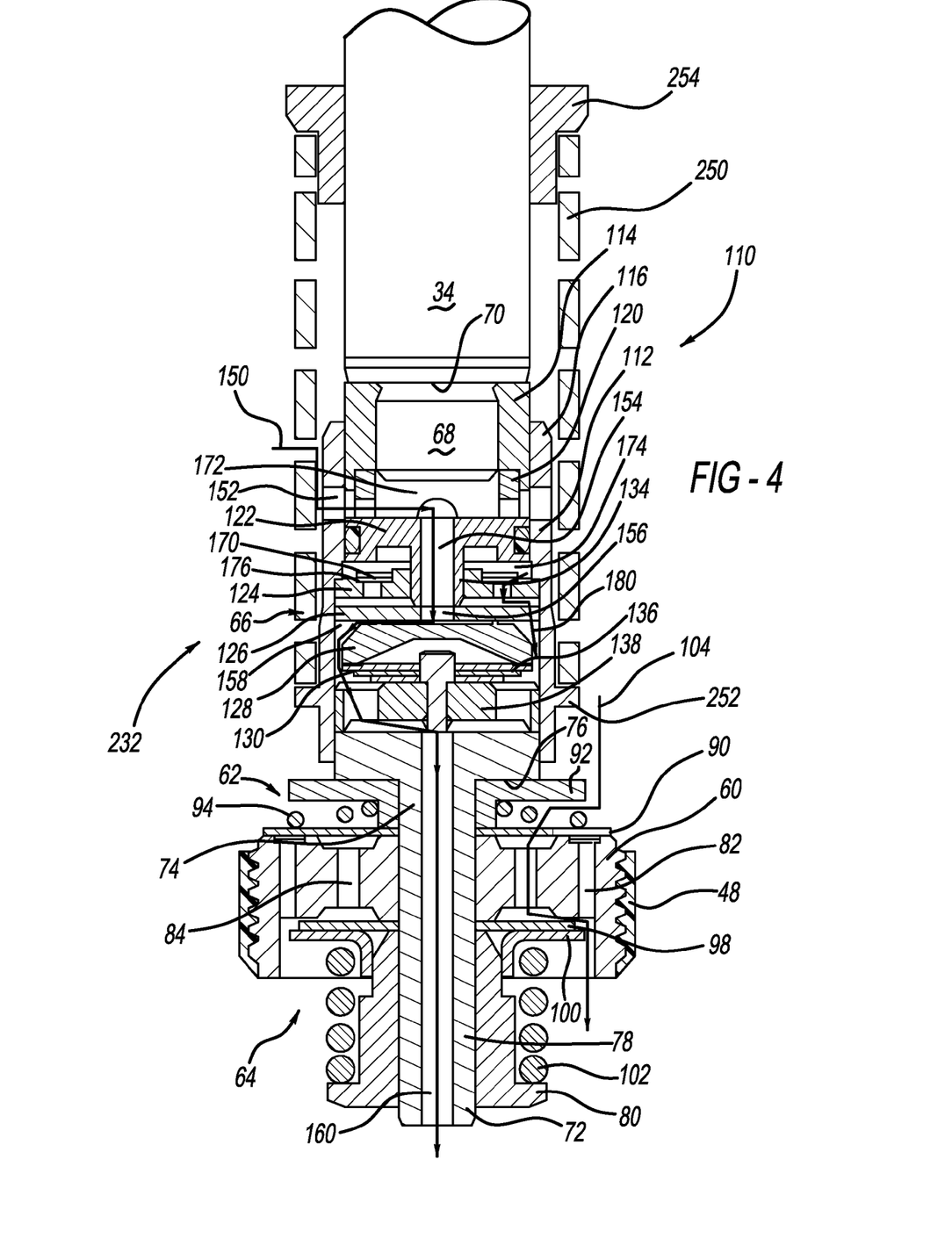
FIG. 4 is an enlarged cross-sectional side view illustrating a frequency dependent device in accordance with another embodiment of the present disclosure which functions during an extension stroke of the shock absorber and which includes a rebound spring.

Referring now to FIG. 4, a piston assembly 232 in accordance with another embodiment of the present disclosure is illustrated. Piston assembly 232 is the same as piston assembly 32 except for the addition of rebound spring 250. As illustrated in FIG. 4, lower housing 116 of housing assembly 110 is provided with a lower spring seat 252 which is a locally increased diameter which is a machined part of lower housing 116 or is a separate part secured to lower housing 116 by welding or by other means known in the art. Rebound spring 250 extends between lower spring seat 252 and an upper spring seat 254. Upper spring seat 254 is slidingly received on piston rod 34 and/or housing assembly 110 and operates to align rebound spring 250 with piston rod 34 and/or housing assembly 110. The combination of the use of frequency dependent valve assembly 66 and the use of rebound spring 250 allows for the improvement of the comfort and rolling of the vehicle. The operation, function and fluid flow described above for frequency dependent valve assembly 66 associated with piston assembly 32 is the same for piston assembly 232.

Referring now to FIG. 5, a piston assembly 332 in accordance with another embodiment of the present disclosure is illustrated. Piston assembly 32 described above has frequency dependent valve assembly 66 positioned such that frequency dependent valve assembly 66 operates only during a rebound (extension) stroke. Piston assembly 332 is the same as piston assembly 32 except that frequency dependency valve assembly is reversed so that frequency dependent valve assembly 66 operates only during a compression stroke.

In piston assembly 32 described above, bypass flow 150 travels from upper working chamber 44 through radial passage 152 into chamber 172, from chamber 172 through axial passages 154 and 156 into bypass chamber 158. Flow path 150 proceeds around the one or more discs 136 of disc pack 130, through disc housing 138 and into axial fluid passage 160 of piston post 72 into lower working chamber 46. This flow occurs during a rebound (extension) stroke. As illustrated in FIG. 5, frequency dependent valve assembly 66 is rotated 180° when it is to operate during a compression stroke. Chamber 172 is no longer in direct communication with upper working chamber 44 through radial passage 152. Chamber 172 is in direct communication with lower working chamber 46 through axial fluid passage 160 of piston post 72.

During a compression stroke, bypass flow 150 travels from lower working chamber 46, through axial fluid passage 160 of piston post 72 into chamber 172, from chamber 172 through axial passages 154 and 156 into bypass chamber 158. Flow path 150 proceeds around the one or more discs 136 of disc pack 130, through disc housing 138 and through radial passage 152 into upper working chamber 44. The operation and function of frequency dependent valve assembly described above for piston assembly 32 is the same for piston assembly 332 but the flow through frequency dependent valve assembly 66 in piston assembly 332 occurs during a compression stroke rather than a rebound (extension) stroke.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A shock absorber comprising:
a pressure tube defining a fluid chamber;
a piston assembly disposed within said pressure tube, said piston assembly dividing said fluid chamber into an upper working chamber and a lower working chamber;
a piston rod projecting out of said pressure tube, said piston assembly being attached to said piston rod;
a frequency dependent valve assembly attached to said piston rod, said frequency dependent valve assembly comprising:

a housing attached to said piston rod, said housing defining a fluid cavity;

a spool valve assembly disposed within said fluid cavity, said spool valve assembly including a spool valve;

a bypass valve assembly responsive to movement of said spool valve, and including a biasing member;

said spool valve including an axial bore extending fully therethrough which defines a fluid passage for enabling a flow of a working fluid through the axial bore; and wherein movement of said spool valve is responsive to a frequency of movement of said piston assembly, and wherein movement of said spool valve within said fluid cavity controls an amount of fluid pressure required to open said bypass valve assembly.

2. The shock absorber according to claim 1, wherein said frequency dependent valve assembly controls fluid flow from said upper working chamber to said lower working chamber.

3. The shock absorber according to claim 1, wherein said frequency dependent valve assembly controls fluid flow from said lower working chamber to said upper working chamber.

4. The shock absorber according to claim 1, wherein said housing is attached to a piston post which defines a fluid passage extending between said lower working chamber and said fluid cavity.

5. The shock absorber according to claim 1, wherein said axial bore of said spool valve is in direct fluid communication with said upper working chamber.

6. The shock absorber according to claim 1, wherein said axial bore of said spool valve is in direct fluid communication with said lower working chamber.

7. The shock absorber according to claim 1, wherein said bypass valve assembly includes an interface and a valve seat plate, said frequency dependent valve assembly further comprising a biasing member biasing said interface into engagement with said valve seat plate, a bypass chamber being defined by said interface and said valve seat plate.

8. The shock absorber according to claim 7, wherein said axial bore of said spool valve is in fluid communication with said bypass chamber.

9. The shock absorber according to claim 8, wherein said axial bore of said spool valve is in direct communication with said lower working chamber.

10. The shock absorber according to claim 8, wherein said axial bore of said spool valve is in direct communication with said upper working chamber.

11. The shock absorber according to claim 1, wherein said axial bore of said spool valve is in direct fluid communication with said bypass valve assembly.

12. A shock absorber comprising:
a pressure tube defining a fluid chamber;
a piston assembly disposed within the pressure tube, the piston assembly dividing the fluid chamber into an upper working chamber and a lower working chamber;
a piston rod projecting out of the pressure tube, the piston assembly being attached to the piston rod;
a frequency dependent valve assembly attached to the piston rod, the frequency dependent valve assembly comprising:
a housing attached to the piston rod, the housing defining a fluid cavity;
a spool valve assembly disposed within the fluid cavity, the spool valve assembly including a spool valve and a bypass valve assembly;
the spool valve including a shaft with an axial bore extending fully therethrough which defines a fluid passage for enabling a flow of a working fluid through a full length of the axial bore;
an interface component axially aligned with the shaft of the spool valve and in direct contact with the shaft, the interface component being operably associated with the bypass valve assembly to control a preload force being applied to the bypass valve assembly, such that axial movement of the spool valve acts on the interface component, which in turn modifies the preload force being applied to the bypass valve assembly, to thus help control a flow of the working fluid through the bypass valve assembly; and
wherein movement of the spool valve is sensitive to different frequencies of movement of the piston assembly, and controls the working fluid flow through the bypass valve assembly differently in response to different frequencies of movement of the piston assembly.

* * * * *